Dec. 2, 1969   W. SNETSELAAR   3,481,519
YARD AND GARDEN TOOL
Filed July 2, 1968
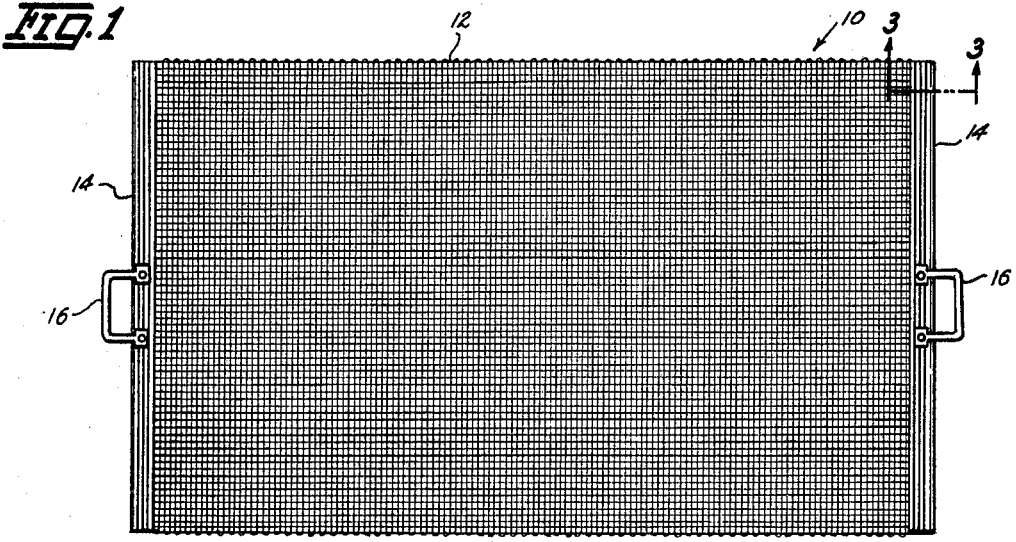
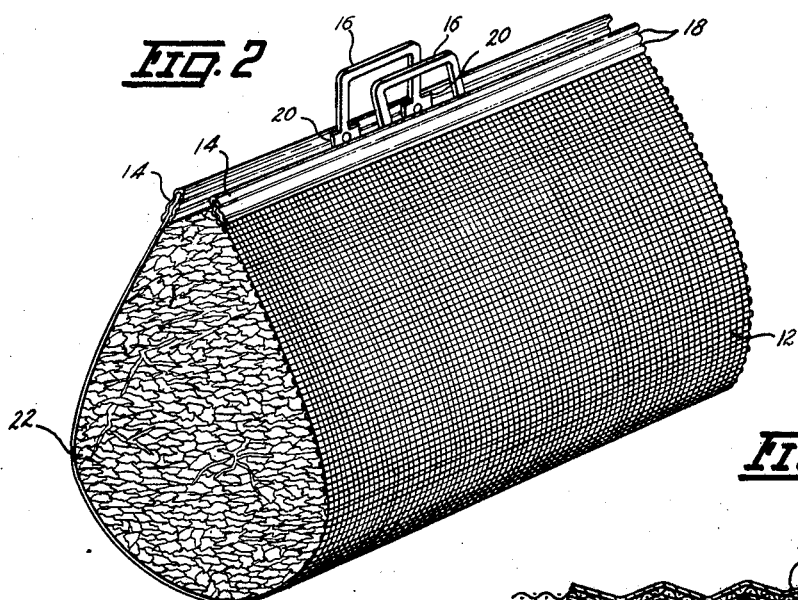
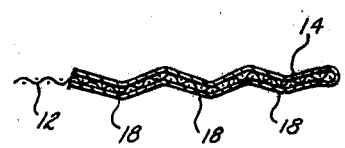
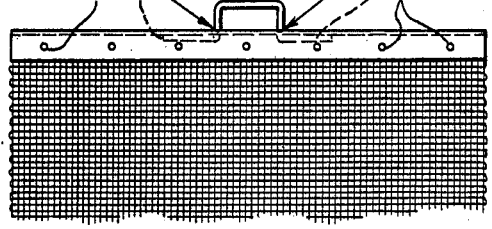
INVENTOR.
WILLIAM SNETSELAAR
BY
ATTORNEY

United States Patent Office 3,481,519
Patented Dec. 2, 1969

3,481,519
YARD AND GARDEN TOOL
William Snetselaar, Colfax, Iowa 50054
Filed July 2, 1968, Ser. No. 747,761
Int. Cl. B65d 71/00
U.S. Cl. 224—49                               1 Claim

ABSTRACT OF THE DISCLOSURE

A tool or aid for yard and garden work in the form of a carrier-type sling. A length of flexible fireproof material, preferably of screen wire; has rigid end bars, which are attached to the ends of the flexible material by a corrugated press method or, alternatively, by riveting. This carrier is designed to be laid flat on the ground where clippings, trash and yard debris can be accumulated thereon and handles on the end bars can be brought together for carrying the debris to a point of disposal.

BACKGROUND OF THE INVENTION

Field of the invention

This invention relates to a yard and garden tool for purposes of holding and transporting grass clippings, yard debris and the like. It embodies an elongated flexible fireproof material supporting member having handles at opposite ends whereby the two handles can be brought together and the entire article carried as a sling.

Description of the prior art

Various types of slings or carrier articles have been designed for particular purposes such as carrying shingles, parcels, books, logs, bowling balls and many other items. In general, such items have utilized flexible material such as canvas and heavy paper and for heavier articles, chains and rods have been used with various types of handles or gripping means utilized to lift the articles to be carried according to the purpose of the carrier. The present invention, while embodying the sling-type principle, is designed more particularly for yard and garden work where the material to be transported is generally deposited at a point where it can be burned. Accordingly, the present invention utilizes fireproof material and has been designed from the standpoint of economy in manufacture together with durability and efficiency for its intended purpose.

SUMMARY

The present invention is designed to provide a useful tool or accessory for use in the yard and garden in gathering leaves, sticks, clippings and other yard debris. Such work generally entails collecting such material as by raking which is usually transferred into baskets, wagons or the like or by carrying them by hand to a point of disposal where the same can be burned. In designing this yard and garden tool, I have used fireproof material, preferably in the form of wire screen mesh and have provided sturdy handles on two opposite ends which are attached to a rigid metal end plate. Such plates are preferably secured to the ends of the screen by a corrugated press or may be attached by means of rivetings. The press method is quite satisfactory, is considerably more economical to produce, requires no maintenance and is extremely efficient for its intended purpose.

The screen is designed to be laid flat on the ground where all material to be transported to the burner or disposal point can be raked directly thereon without requiring any stooping or bending. By then bringing the handles together, they can be grasped and the sling carried to a point of disposal.

The objects of this invention together with the details of the construction and use thereof as outlined above and the advantages of the same will be more fully described and developed in relation to the more detailed description of the accompanying drawings.

BRIEF DESCRIPTION OF THE DRAWINGS

FIG. 1 is a top plan view showing this carrier tool in open position for loading, FIG. 2 is a perspective view showing this carrier loaded and in closed position, FIG. 3 is an enlarged cross sectional view taken on the line 3—3 of FIG. 1, and FIG. 4 is a fragmentary elevational view of one end of this carrier showing a modified form of end plate and handle.

DESCRIPTION OF THE PREFERRED EMBODIMENT

Referring to the drawings, this yard tool or carrier, designated generally by the numeral 10, comprises an elongated flat flexible body or carrier member 12 of any suitable fireproof material and preferably I have used a length of screen wires as illustrated. While precise dimensions for member 12 may be varied, a size of twenty-eight by forty inches lends itself for ease in handling for the uses intended. The use of wire screening provides a relatively rigid body 12, is fireproof and may be easily converted from the position shown in FIG. 1 to that shown in FIG. 2, all of which are desirable characteristics in the environment in which this carrier will be used.

At each end of member 12, a rigid metal end piece 14 is suitably secured to support the handles 16. While end pieces 14 may be provided in various forms such as rod or bar material, I have preferably used elongated sheet metal strips of approximately two inches in width and generally not exceeding a twenty-four gauge thickness as seen in FIGS. 1 and 2. Such strips are folded longitudinally into a general U shape where, with an edge of body member 10 inserted into the fold, such strips can be longitudinally crimped such as by a corrugated press forming the multiple longitudinal corrugations 18 as best seen in FIG. 3 whereby such strips are securely attached to the body or carrier 10. This is a simple but effective means of attachment and can be accomplished quite economically without the necessity for using separate fastening elements. By extending corrugations 18 transversely of the longitudinal axis of carrier 10, it will be appreciated that for all practical purposes, a permanent and storng attachment of strips 14 to the carrier 10 has been effected.

Handles 16 preferably have the enlarged flat ends 20 by which they may be spot welded to one side of the strips 14 as seen in FIG. 1. In this regard, such handles are so attached so as to be on the inside of the carrier when folded as shown in FIG. 2 for carrying debris 22 or the like.

With reference to FIG. 4, end pieces 14 are shown attached to carrier 10 by means of rivets 24 which may be used, if desired. In this arrangement, and prior to affixing rivets 24, each folded strip 14 is preferably provided with two spaced holes along the fold line to receive the bent arms 28 of a handle 30 as shown. In this position, rivets 24 will suitably secure strips 14 to carrier 10 and handles 30 to such respective strips.

In using this article, it is first laid out flat on the ground as shown in FIG. 1 where its rigidity will provide a firm base upon which grass, clippings, leaves and other debris can be conveniently raked or placed thereon. In this regard, the screen material, while flexible and susceptible of being folded into a sling form, is sufficiently rigid so that the ends will not wrinkle, fold back or tear from any action by the rake.

Likewise, carrier 10 being of screen wire is not susceptible of being punctured or torn by sticks and the like as is the case with the canvas and paper type slings heretofore available for various other purposes. In addition, the bringing of the handles together will compress and tightly hold the debris 22 so as to minimize any of the same being dropped or blown about by the wind. A further advantage of carrier 10 is, that being fireproof, there is no danger of it catching fire when the debris 22 is deposited in a burning fire, for example. The construction of this article is such that even if the same is exposed to flame for a short time, such exposure will in no way have any adverse effect upon the usefulness of this item. It is also pointed out that the handles are attached to the end plates in such a fashion that such point of attachment will not touch or catch the clothes of the person who may be carrying the same. Accordingly, from the foregoing, it is thought a full understanding of the construction and use of this invention will be had and the advantages of the same will be appreciated.

It will be understood that the phraseology employed herein is for the purpose of description and not for limitation and that modification and changes in the construction and arrangement of this invention can be made within the scope of what is claimed, without departing from the spirit and purpose thereof.

I claim:
1. A material carrier, comprising:
   an elongated relatively rigid but flexible fireproof screen wire body member having longitudinal side edges and respective ends,
   an elongated bendable fireproof end piece provided with a longitudinal fold to define a U shape to embrace and be secured to each respective end of said body member,
   said end pieces being interlocked with the end of said body member by being crimped against the same,
   said crimping defining corrugations in said end pieces and ends with the peaks and valleys of said corrugations extending transversely of the longitudinal axis of said body member and the rows of peaks and valleys extending longitudinally of said body member,
   a fireproof handle secured to each end piece,
   said body member designed to be laid flat on the ground so that yard debris can be raked and placed thereon,
   the longitudinal side edges of said body member being of sufficient rigidity to resist wrinkling, folding and tearing from any contact by a rake, and
   said body member susceptible of being folded by bringing said handles together whereby debris is compressed and held and said body member can be manually carried by said handles to a point of deposit.

References Cited

UNITED STATES PATENTS

| | | | |
|---|---|---|---|
| 996,221 | 6/1911 | Daly. | |
| 1,118,519 | 11/1914 | Weaver | 224—49 |
| 2,829,853 | 4/1958 | Wheeler et al. | 224—49 XR |
| 3,167,227 | 1/1965 | Walden | 224—49 |

GERALD M. FORLENZA, Primary Examiner